United States Patent [19]
Thomson

[11] 3,884,365
[45] May 20, 1975

[54] WORKPIECE MANIPULATOR

[75] Inventor: John B. Thomson, Manhasset, N.Y.

[73] Assignee: Thomson Industries, Inc., Manhasset, N.Y.

[22] Filed: Mar. 19, 1974

[21] Appl. No.: 452,655

[52] U.S. Cl.......... 214/1 CM; 214/1 BC; 214/1 BD; 214/146.5
[51] Int. Cl............................................. B25j 1/12
[58] Field of Search.. 214/1 CM, 1 BB, 1 BC, 1 BD, 214/1 BT, 1 BH, 1 BV, 146.5

[56] References Cited
UNITED STATES PATENTS

| | | | |
|---|---|---|---|
| 975,727 | 11/1910 | Smith | 294/19 R X |
| 2,959,301 | 11/1960 | Willsea | 214/1 CM |

Primary Examiner—Robert J. Spar
Assistant Examiner—George F. Abraham
Attorney, Agent, or Firm—Morgan, Finnegan, Durham & Pine

[57] ABSTRACT

A workpiece manipulator including an arm having a tool mounted on one end for gripping a workpiece at a work station, a transverse member capable of being fixedly positioned at the work station, a vertical member having means for movably receiving the manipulator arm, and connector means for movably connecting the vertical and transverse members so that the tool may be readily moved through one or more of five different axial movements to any desired orientation at the work station for gripping of the workpiece without requiring the operator to place his hands near the tool.

14 Claims, 7 Drawing Figures

PATENTED MAY 20 1975   3,884,365

WORKPIECE MANIPULATOR

BACKGROUND AND OBJECTS OF THE INVENTION

The present invention relates generally to workpiece manipulators for remotely handling objects of materials, and relates more specifically to certain new and useful improvements in such workpiece manipulators which provide greater freedom of action and simplified manufacture.

Workpiece manipulators for remotely handling objects or materials are known in the art. Heretofore, however, previously known manipulators have been disadvantageous as they are generally complex in nature and do not readily provide sufficient overall freedom of movement to enable an operator to rapidly and accurately engage a workpiece at a work station. Examples of such prior manipulator devices are shown in U.S. Pat. Nos. 975,727 (Smith); 2,632,574 (Goertz); and 3,535,952 (Devol).

It is therefore an object of the present invention to provide a new and improved workpiece manipulator, which allows the operator to rapidly and accurately remotely grip and manipulate a workpiece at a work station.

A further object of the present invention is to provide a workpiece manipulator that is of simple construction and is easy to adjust and maintain at the desired positions of orientation.

A further object of the present invention is to provide a workpiece manipulator which is particularly suited for use in remotely manipulating workpieces in punch and forging presses, as well as other machines having closing elements, so as to prevent the operator from exposing his hands to the press tool.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

SUMMARY OF THE INVENTION

Briefly described, the present invention is directed to a new and improved workpiece manipulator capable of remotely manipulating a wide variety of objects or materials and also capable of usage with a wide variety of different machines.

As preferably embodied, the manipulator includes an arm having a tool mounted on one end for gripping a workpiece at a work station, a vertical member including means at its upper end mounting the manipulator arm for rotational and reciprocatory movement with respect to the vertical member, a transverse member capable of being fixedly mounted at the work station, and connecting means mounted on the stationary transverse member for rotational and reciprocatory movement with respect to the transverse member, the connecting means also mounting the vertical member for rotational and reciprocatory movement with respect to the transverse member. Adjustable means are also included for maintaining the manipulator arm and tool at a given height, angle of rotation and pivotal position, and for limiting its transverse, sweeping, and in and out reciprocating movement.

It will be apparent from the foregoing general description that the objects of the invention specifically enumerated herein are accomplished by the invention as here embodied.

Thus, it will be seen that the manipulator arm is capable of (1) rotational movement about its own longitudinal axis; (2) in and out reciprocatory movement with respect to the work station, as well as (3) lateral reciprocatory movement with respect to the work station, and (4) vertical reciprocatory movement with respect to the work station; (5) pivotal "swing" movement about the transverse shaft; and (6) pivotal "sweep" movement about the vertical shaft. These movements provide the manipulator arm with greatly increased freedom of action over previously known manipulator devices, permitting the operator to rapidly and accurately engage and manipulate a workpiece from a remote location.

In addition, it will be seen that the aforementioned directions of movement are provided for by appropriately arranging a plurality of sleeves carrying linear-motion ball bearings on horizontal and vertical shafts, so that each shaft is capable of both rotational and reciprocatory movement with respect to each sleeve. Thus, the instant manipulator is of simple, rugged construction and may be easily adjusted and maintained in the desired position of orientation by means of simple collars and lock screws.

It will thus be seen that the five axial movements permit a workpiece manipulator to be constructed as a standard unit which is capable of usage on a wide variety of different machines and of remotely handling a wide variety of parts on each machine with which it is used.

It will be understood that the foregoing general description and the following detailed description as well are exemplary and explanatory of the invention but are not restrictive thereof.

The accompanying drawings, referred to herein and constituting a part hereof, illustrate a preferred embodiment of the invention, and together with the description, serve to explain the principles of the invention.

DESCRIPTION OF THE PREFERRED EMBODIMENT

Figure 1:
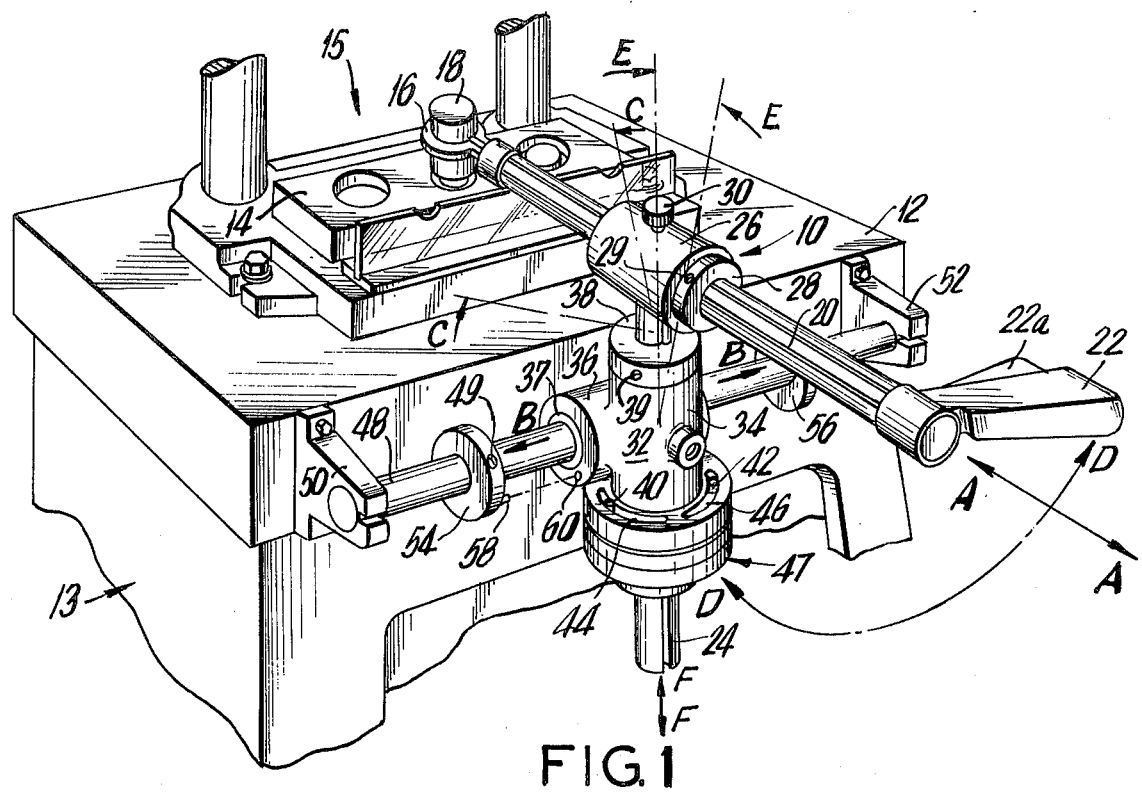
FIG. 1 is a perspective view of a workpiece manipulator constructed in accordance with the present invention mounted to the bed of a press.

Referring now more particularly to the preferred embodiment of the invention shown in the accompanying drawings, there is illustrated a workpiece manipulator, indicated generally by reference numeral 10, shown mounted to a bed 12 of a press 13, the press bed 12 including a multi-station die 14 defining a work station, indicated generally by reference numeral 15.

As previously indicated, manipulator 10 has utility wherever it is desired to remotely manipulate an object or material without placing the operator's hands near the work station. However, since the invention is particularly adaptable to usage with punch and forging presses, reference is herein made to that application in order to present an example of a practical use for the invention.

The workpiece manipulator 10 includes an arm 20 with a tool 16 mounted on one end and a handle 22 with control trigger 22a mounted at the opposite end. The tool 16 is shown engaging a workpiece 18 at the work station 15. It will be understood that the tool 16 may comprise any of a number of attachments for gripping the workpiece 18, e.g., round grippers, V grippers, wide jaw grippers, scissor grippers, suction cups, nests, magnets, and the like. The control trigger 22a advantageously is mechanically coupled to the tool 16 through a mechanical linkage (not shown) within the arm 20, and serves to actuate the tool 16.

The manipulator arm 20 is mechanically coupled to a vertical shaft 24 through a sleeve 26 mounted on the upper end of the vertical shaft 24. The inside diameter of the sleeve 26 and outside diameter of the arm 20 are such as to allow forward and backward, or "in and out," reciprocating movement of the arm 20 with respect to the sleeve 26. Advantageously, the sleeve 26 may include one or more bearings or bushings (not shown) which may suitably be linear motion ball bearings, as shown in U.S. Pat. Nos. 2,626,135 or 3,545,826.

A pair of slidably adjustable stop collars 28, only one of which is seen in FIG. 1, are mounted on arm 20 and positioned on opposite sides of the sleeve 26. Each of the adjustable stop collars 28 advantageously includes a set screw 29, which permits collar 28 to slide on arm 20 when loosened but which may be tightened against arm 20 to lock the collar 28 to the arm at the desired position, thereby limiting the distance of reciprocating movement of arm 20 through sleeve 26. Thus, collars 28 may abut the ends of the sleeve 26 to prevent both forward and backward movement of arm 20, or in some cases may be equally or non-equally spaced therefrom to allow the desired amount of forward or backward movement. As a result of properly positioning the collars 28, the desired reciprocating movement of the arm 20 and tool 16 is attained.

Arm 20 is also advantageously freely rotatable within sleeve 26 so as to orient the angle of the tool 16 as desired for proper gripping of the workpiece 18 at the work station 15. An anti-rotation lock, including an adjustable screw 30 positioned within an aperture in the side wall of sleeve 26, may be tightened to engage the arm 20 and maintain the desired angular position of the arm 20 and tool 16. Where, as previously indicated, sleeve 26 advantageously includes one or more linear motion ball bearings, arm 20 is suitably grooved as illustrated in FIG. 1 for engagement therewith. Thus, rotary motion of arm 20 is transmitted to an internal sleeve (not shown) mounting the linear bearings within sleeve 26, which internal sleeve can be locked against rotation by screw 30 when the desired angle of the workpiece holder 16 has been reached.

In accordance with the invention, connecting means are mounted on a stationary transverse member for both rotational and reciprocatory movement with respect thereto and also for both rotational and reciprocatory movement with respect to vertical shaft 24.

To this end, there is provided a connector member 32 which includes two sleeves 34 and 36 arranged at right angles to one another. Advantageously, each of sleeves 34 and 36 may include a bearing or bushing which may suitably be a linear motion ball bearing, as in the case of sleeve 26. The bushing for sleeve 36 is indicated as 37; the bushing for sleeve 34 is not shown. The vertical shaft 24 extends through vertical sleeve 34 and is dimensioned relative to the sleeve 34 so that sleeve 34 is movable both rotatably and vertically reciprocally relative to the vertical shaft 24.

A vertical height adjustment collar 38 is mounted on the vertical shaft 24 above the sleeve 34. Thus, the vertical height of the arm 20 and tool 16 may be adjusted by moving the vertical shaft 24 upwardly or downwardly and tightening screw 39 of collar 38 to engage the vertical shaft 24. The collar 38 will abut the upper end of the sleeve 34 and hold the vertical shaft 24 at the desired height.

As previously mentioned, the vertical shaft 24 may also rotate within the sleeve 34 to impart a sweeping movement to the arm 20 and tool 16 about vertical shaft 24. To limit the sweeping movement of the tool 16, the vertical shaft 24 is mechanically coupled to a pair of adjustable lugs 40 and 42. Lugs 40 and 42 may be adjustably positioned relative to the ends of slots 44 and 46 arranged in an enlarged portion 47 mounted concentric with the vertical sleeve 34 of connector 32. When the vertical shaft 24 is rotated within sleeve 34, lugs 40 and 42 abut against the ends of slots 44 and 46, respectively, to establish the limits of the sweeping movement.

The horizontal sleeve 36 of connector 32 is mounted on a transverse shaft 48. The transverse shaft 48 is dimensioned relative to the sleeve 36 so that the sleeve 36, and therefore connector 32, are movable both rotatably and horizontally reciprocally relative to the transverse shaft 48.

Transverse shaft 48 advantageously is fixedly mounted to the press bed 12 by a pair of end brackets 50 and 52. The stationary transverse shaft 48 includes a pair of adjustable stop collars 54 and 56 positioned on opposite sides of the sleeve 36. Transverse movement of the connector 32, and therefore the manipulator arm 20 and tool 16, is limited by adjusting the position of the collars 54 and 56 on the transverse shaft 48 and tightening set screw 49 (only one is shown) until the position of each of the collars 54 and 56 is fixed relative to the transverse shaft 48. Abutment of the ends of the sleeve 36 with the collars 54 and 56 will establish the limits of the transverse movement of the connector 32 along the transverse shaft 58.

Each of collars 54 and 56 also advantageously include laterally extending pins 58 (only one of which is shown) which are engaged by retractable tubes 60 (only one of which is shown) which may extend outwardly from the sleeve 36 to receive the pins 58. Engagement of the retractable tubes 60 with the pins 58 mechanically couples the sleeve 36 to the collars 54 and 56, preventing any pivotal or swinging movement of the manipulator arm and tool 16 about the stationary transverse shaft 48.

Figure 2:
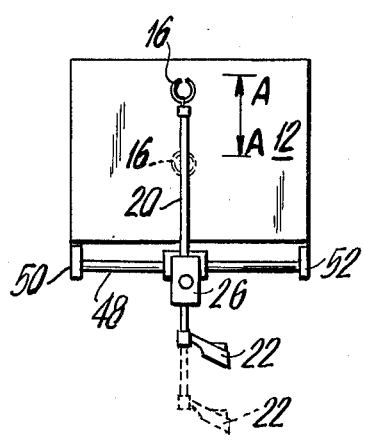
FIG. 2 is a simplified top plan view of FIG. 1, showing in and out reciprocatory movement of the manipulator arm and tool.

Referring now more particularly to FIG. 2, it will be seen that the manipulator arm 20 and tool 16 are capable of undergoing "in and out" reciprocatory movement relative to the work station 15, as illustrated by the solid and dotted positions of the arm 20 and tool 16. The arrows indicating this mode of movement have been labeled A in FIG. 1. To achieve this mode of movement, the arm 20 is reciprocated relative to the sleeve 26.

Figure 3:
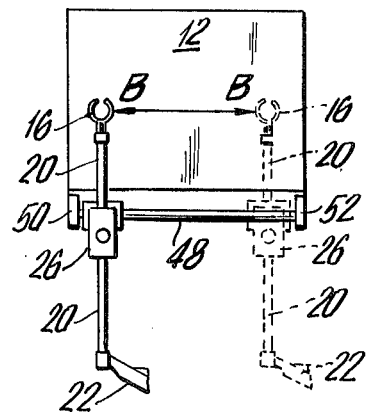
FIG. 3 is a simplified top plan view of FIG. 1, showing transverse, or lateral, reciprocatory movement of the manipulator arm and tool.

Referring now more particularly to FIG. 3, it will be seen that the manipulator arm 20 and tool 16 are capable of undergoing transverse movement relative to the work station 15 as illustrated by the solid and dotted positions of the arm 20 and tool 16. The arrows indicating this mode of movement have been labeled B in FIG. 1. To achieve this mode of movement, the connector 32 is moved transversely along the stationary transverse shaft 48.

Figure 4:
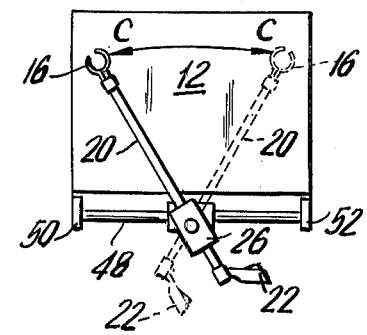
FIG. 4 is a simplified top and plan view of FIG. 1, showing sweeping movement of the manipulator arm and tool.

Referring now more particularly to FIG. 4, it will be seen that the manipulator arm 20 and tool 16 are capable of undergoing sweeping movement relative to the work station 15 as illustrated by the solid and dotted positions of the arm 20 and tool 16. The arrows indicating this mode of movement have been labeled C in FIG. 1. To achieve this mode of movement, the vertical shaft 24 is rotated within the vertical sleeve 34 of connector 32.

Figure 5:
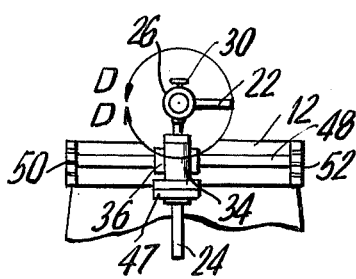
FIG. 5 is a simplified front view of FIG. 1, showing rotational movement of the manipulator arm and tool.

Referring now more particularly to FIG. 5, it will be seen that the manipulator arm 20 and tool 16 are capable of undergoing rotational movement relative to the work station 15, as illustrated by the direction of the arrow. The arrow indicating this mode of movement has been labeled D in FIG. 1. To achieve this mode of movement, the arm 20 is rotated within the sleeve 26.

Figure 6:
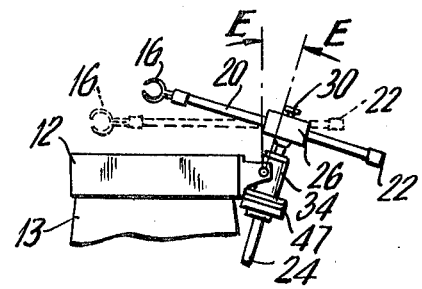
FIG. 6 is a simplified side view of FIG. 1, showing pivotal or swinging movement of the manipulator arm and tool.

Referring now more particularly to FIG. 6, it will be seen that the manipulator arm 20 and tool 16 are capable of undergoing pivotal or swinging movement relative to the work station 15, as illustrated by the solid and dotted positions of the shaft 20 and tool 16. The arrows indicating this mode of movement have been labeled E in FIG. 1. To achieve this mode of movement, the horizontal sleeve 36 of connector 32 is rotated about the stationary transverse shaft 48.

Figure 7:
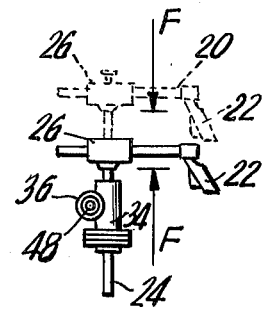
FIG. 7 is a simplified side view of FIG. 1, showing vertical reciprocatory movement of the manipulator arm and tool.

Referring now more particularly to FIG. 7, it will be seen that the height of the shaft 20 and tool 16 may be adjusted relative to the work station 15, as illustrated by the solid and dotted positions of the arm 20 and vertical shaft 24. The arrows indicating this mode of movement have been labeled F in FIG. 1. To achieve the proper height adjustment, the vertical shaft 24 is moved upwardly or downwardly relative to the vertical sleeve 34 of connector 32 and the collar 38 is locked to the vertical shaft at the proper point.

It will be apparent from the foregoing that, in operating the workpiece manipulator 10, the operator selects the proper tool 16 and mounts it on the arm 20. The various limit means and lock means are then set, as desired, to properly orient the tool 16 and provide rapid and accurate gripping of the workpiece 18 for movement at the work station 15. The tool 16 is actuated to grip the workpiece 18 by pressing on the control trigger 22a.

The foregoing description should be construed in an illustrative and not in a limiting sense. Thus, it will be understood by those skilled in the art that various modifications may be made in the present invention without departing from the spirit and scope thereof as described in the specification and defined in the appended claims.

What is claim is:

1. A workpiece manipulator for manipulating a tool to grip a workpiece, comprising:
    an arm for receiving said tool including means for actuating said tool to grip said workpiece;
    a vertical member, said vertical member including means mounting said arm for reciprocatory movement laterally relative to the axis of said vertical member;
    a transverse member; and
    means connecting said vertical member and said transverse member, said connecting means being movable both horizontally reciprocally along and rotationally about said transverse member and also being movable vertically reciprocally along said vertical member while permitting said vertical member to rotate about its longitudinal axis,
        whereby said manipulator arm may be independently moved in any one or more of vertical, horizontally lateral, and horizontally in and out directions, as well as rotatably about its own longitudinal axis and pivotally about each of said vertical and transverse members.

2. A workpiece manipulator as claimed in claim 1 including:
    means for limiting in and out reciprocatory movement of said arm; and
    means for maintaining the desired rotational position of said arm while permitting said in and out reciprocatory movement thereof.

3. A workpiece manipulator as claim in claim 1 including means for limiting the rotational movement of said vertical member.

4. A workpiece manipulator as claimed in claim 1 including means for limiting the transverse movement of said connecting means along said transverse member.

5. A workpiece manipulator as claimed in claim 1 including means for maintaining the desired pivotal position of said connecting means relative to said transverse member.

6. A workpiece manipulator as claimed in claim 1 including adjustable means for limiting the movement of said vertical member relative to said connecting means.

7. A workpiece manipulator for manipulating a tool to grip a workpiece at a work station, comprising:
    a transverse shaft fixedly positioned at said work station;
    a vertical shaft including a sleeve at its upper end;
    connector means mounted on said transverse shaft for movably receiving said vertical shaft, said connector means being movable along and pivotal about said transverse shaft;
    an arm extending through said sleeve, said arm adapted to hold said tool at one end and including means for actuating said tool so as to grip said workpiece, said arm capable of undergoing both reciprocatory and rotational movement within said sleeve and sweeping movement relative to said connector means upon rotation of said vertical shaft within said connector means.

8. A workpiece manipulator as recited in claim 7 including:
means for limiting the transverse movement of said connector means.

9. A workpiece manipulator as recited in claim 7 including:
means for limiting the rotational movement of said vertical shaft.

10. A workpiece manipulator as recited in claim 7 including:
means for maintaining the rotational position of said arm relative to said sleeve.

11. A workpiece manipulator as recited in claim 7 wherein:
said vertical shaft is movable vertically relative to said connector means, and adjustable means is included for limiting the movement of said vertical shaft relative to said connector means.

12. A workpiece manipulator as recited in claim 7 including:
means for limiting in and out reciprocatory movement of said arm relative to said sleeve.

13. A workpiece manipulator as recited in claim 7 including:
means for maintaining the pivotal position of said connector means relative to said transverse shaft.

14. A workpiece manipulator capable of manipulating a tool to grip a workpiece for loading, transfer or unloading machinery operations and the like, comprising:
an arm adapted to hold a tool at one end;
a transverse shaft adapted to be fixedly mounted at the desired work station;
a vertical shaft;
a sleeve mounted on said vertical shaft to movably receive said arm, said arm being rotatable and reciprocable within said sleeve;
a pair of adjustable collars mounted on said arm on opposite sides of said sleeve to limit the reciprocatory movement of said arm by abutment against the ends of said sleeve;
said sleeve including locking means for maintaining the rotational position of said arm relative to said sleeve while permitting reciprocatory movement of said arm;
connecting means movably receiving both said transverse shaft and said vertical shaft, said connecting means being capable of movement along and pivotal movement about said transverse shaft to provide transverse and pivotal movement to said arm, said vertical shaft being rotatable within and movable vertically relative to said connecting means;
adjustable stop collars mounted on said transverse shaft on opposite sides of said connecting means to limit the transverse movement of said connecting means, said adjustable stop collars also including means to prevent rotation of said connecting means about said transverse shaft;
means mechanically coupled to said vertical shaft to limit the rotational movement thereof;
an adjustable collar mounted on said vertical shaft for limiting the movement of said vertical shaft relative to said connecting means; and
means mechanically coupled to said arm for actuating said tool to grip said workpiece.

* * * * *